(12) United States Patent
Jung

(10) Patent No.: US 11,529,870 B2
(45) Date of Patent: Dec. 20, 2022

(54) MOUNTING SYSTEM FOR POWERTRAIN OF VEHICLE

(71) Applicants: HYUNDAI MOTOR COMPANY, Seoul (KR); KIA MOTORS CORPORATION, Seoul (KR)

(72) Inventor: Nam Chul Jung, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 291 days.

(21) Appl. No.: 17/012,433

(22) Filed: Sep. 4, 2020

(65) Prior Publication Data

US 2021/0107354 A1    Apr. 15, 2021

(30) Foreign Application Priority Data

Oct. 15, 2019  (KR) .................. 10-2019-0127389

(51) Int. Cl.
| | | |
|---|---|---|
| *B60K 1/00* | (2006.01) | |
| *B60K 17/12* | (2006.01) | |
| *B60K 8/00* | (2006.01) | |
| *F16F 15/08* | (2006.01) | |

(52) U.S. Cl.
CPC .............. *B60K 17/12* (2013.01); *B60K 1/00* (2013.01); *B60K 8/00* (2013.01); *F16F 15/08* (2013.01)

(58) Field of Classification Search
CPC ........ B60K 17/12; B60K 17/06; B60K 17/00; B60K 17/04; B60K 1/00; B60K 8/00; B60K 6/00; B60K 6/20; B60K 6/26; B60K 6/36; B60K 6/40; B60Y 2200/14; B60Y 2200/142; B60Y 2200/1422; B60Y 2200/10; B60Y 2200/141; B60Y 2306/09; F16F 15/08; F16F 15/04; F16F 15/00; F16F 15/10
See application file for complete search history.

(56) References Cited

U.S. PATENT DOCUMENTS

| | | | | |
|---|---|---|---|---|
| 3,773,132 A | * | 11/1973 | Gawlik | ..................... B60K 1/00 |
| | | | | 180/908 |
| 4,593,786 A | * | 6/1986 | Tate | ......................... B60L 50/66 |
| | | | | 123/196 AB |
| 7,588,117 B2 | * | 9/2009 | Fukuda | ................. B62D 21/155 |
| | | | | 180/291 |

(Continued)

*Primary Examiner* — James M Dolak
(74) *Attorney, Agent, or Firm* — Lempia Summerfield Katz LLC

(57) ABSTRACT

A mounting system for a powertrain of a vehicle may secure a sufficient installation space inside of vehicle body frames and greatly reduce a height difference between the center of gravity of a motor-reducer assembly and insulators, thus greatly improving NVH performance of the vehicle. The mounding system includes: mounting units to mount the powertrain of the vehicle to the vehicle body frames. Each mounting unit includes: a vehicle body-side bracket coupled to the vehicle body frame, a powertrain-side bracket coupled to the powertrain, and an insulator installed between the vehicle body-side bracket and the powertrain-side bracket. The vehicle body-side bracket as coupled to an outer surface of the vehicle body frame extends downwards from the vehicle body frame, and thus, the vehicle body-side bracket and the insulator are located in an outer space of the vehicle body frame.

10 Claims, 3 Drawing Sheets

[ CROSS-SECTION TAKEN ALONG LINE A-A ]

(56) References Cited

U.S. PATENT DOCUMENTS

| | | | | |
|---|---|---|---|---|
| 7,886,861 | B2* | 2/2011 | Nozaki | B60K 1/00 280/783 |
| 8,522,909 | B2* | 9/2013 | Niina | B60K 5/1241 180/311 |
| 8,733,492 | B2* | 5/2014 | Tachibana | B60K 1/00 180/312 |
| 8,851,223 | B2* | 10/2014 | Yamashita | B60K 1/00 180/300 |
| 9,010,479 | B2* | 4/2015 | Kambayashi | B60K 1/00 180/297 |
| 9,283,837 | B1* | 3/2016 | Rawlinson | B60K 8/00 |
| 9,630,488 | B2* | 4/2017 | Koenig | B60G 3/20 |
| 9,963,094 | B2* | 5/2018 | Richthammer | B60K 6/52 |
| 10,953,738 | B2* | 3/2021 | Hamel | F16M 13/02 |
| 11,148,515 | B2* | 10/2021 | Ito | B60K 6/44 |

\* cited by examiner

FIG. 1 "PRIOR ART"
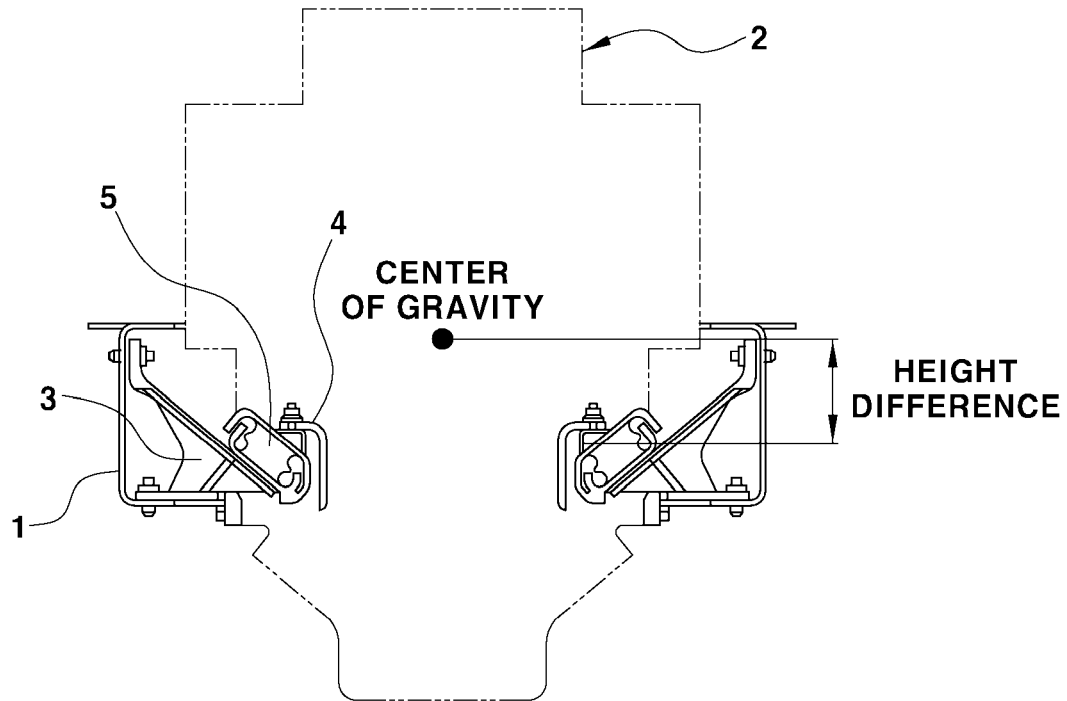
FIG. 2 "PRIOR ART"
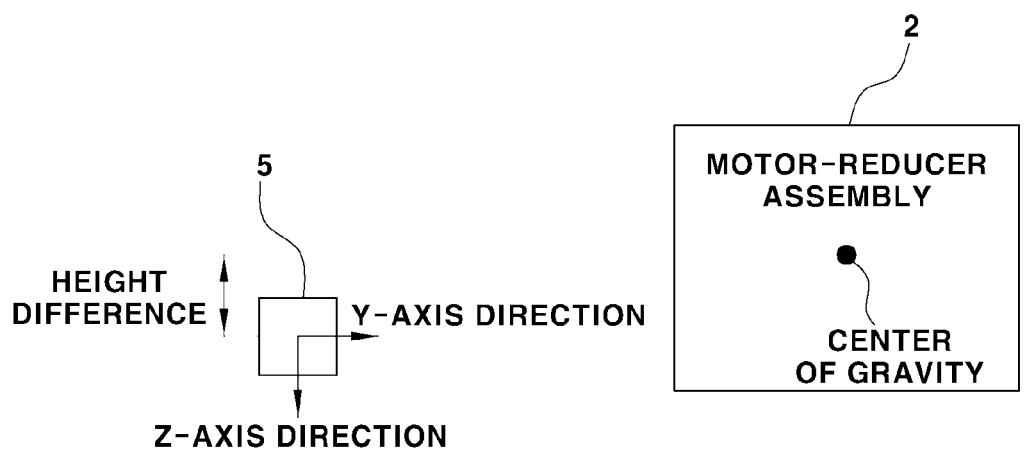

[ CROSS-SECTION TAKEN ALONG LINE A-A ]

MOUNTING SYSTEM FOR POWERTRAIN OF VEHICLE

CROSS-REFERENCE TO RELATED APPLICATION

This application claims priority to and the benefit of Korean Patent Application No. 10-2019-0127389, filed on Oct. 15, 2019, the entire contents of which are incorporated herein by reference.

FIELD

The present disclosure relates to a mounting system for a powertrain of a vehicle. More particularly, it relates to a mounting system which serves to mount a powertrain including a motor and a reducer on vehicle body frames.

BACKGROUND

The statements in this section merely provide background information related to the present disclosure and may not constitute prior art.

In a general vehicle, a powertrain including an engine, a transmission, etc. is mounted on a vehicle body frame using a mounting system having a vibration isolation function, and main functions of the mounting system are to support the weight of the powertrain on the vehicle body frame and to prevent transmission of vibration of the engine to the vehicle body frame.

The mounting system for the powertrain having the vibration isolation function is an important factor which has a great effect on marketability of the vehicle including performance, such as vibration, noise, ride comfort, etc.

An engine mounting system, which is generally used in a commercial diesel vehicle, such as a truck, is installed on a vehicle body frame to be inclined at a designated angle, so as to suppress vibration caused by engine behavior.

FIG. 1 schematically illustrates a supported state of a powertrain including an engine, a transmission, etc. by a conventional mounting system of a truck.

As shown in FIG. 1, the mounting system is configured to support a powertrain 2 including an engine, a transmission, etc. on vehicle body frames 1, and the vehicle body frame 1 includes vehicle body-side brackets 3 which are fixedly installed at inner surfaces of the vehicle body frames 1, powertrain-side brackets 4 which are fixedly installed at one side of the powertrain 2 (one side of the engine), and insulators 5 which are installed to be interposed between the vehicle body-side brackets 3 and the powertrain-side brackets 4 so as to insulate vibration.

Here, a vehicle body frame 1 extending in forward and backward directions is disposed at each of both sides of a vehicle, (i.e., first and second vehicle body frames 1 are respectively arranged on both sides of the vehicle), and FIG. 1 illustrates the cross-sectional shape of the vehicle body frames 1.

As shown in FIG. 1, the first and second vehicle body frames 1 have an approximately C-shaped cross-section, and the powertrain 2 including the engine, the transmission, etc. is mounted between the two vehicle body frames 1.

Here, the vehicle body-side bracket 3 and the insulator 5 are located within an inner space of the vehicle body frame 1, and there is a height difference between the positions of the insulators 5 of the mounting system and the center of gravity of the engine (referring to FIG. 2).

The mounting system of FIG. 1 is applied to a truck provided with a diesel engine installed therein, and, if this mounting system is applied to a motor-driven vehicle, such as a hydrogen fuel cell vehicle or an electric vehicle, we have discovered the following problems.

In the hydrogen fuel cell vehicle or the electric vehicle, among components of a powertrain, an engine is replaced with a motor, and the powertrain including the motor, a reducer, etc. is mounted on two vehicle body frames disposed in forward and backward directions at both sides of the vehicle using a mounting system, in the same manner as a general truck provided with a diesel engine installed therein.

First, the hydrogen fuel cell vehicle or the electric vehicle has a large number of hoses, pipes and wiring elements which must be installed in inner spaces of vehicle body frames, as compared to the general diesel engine vehicle.

For example, a cooling water hose or pipe, a high voltage cable, etc. are disposed in the inner spaces of the vehicle body frames, and if the same mounting system as in the general diesel truck is provided, the brackets 3 and the insulators 5 are located within the inner spaces of the vehicle body frames 1, and thus, there is no room for the cooling water hose or pipe, the high voltage cable, etc.

Further, we have found that if the conventional mounting system is applied to the motor-driven vehicle, as shown in FIG. 2, there may be a height difference between the positions of the insulators 5 of the mounting system and the center of gravity of the powertrain 2, and vibration insulation performance of the vehicle may be greatly deteriorated due to such a height difference.

In more detail, in the motor-driven vehicle, such as the hydrogen fuel cell vehicle or the electric vehicle, the motor outputs a large torque in a low RPM region, and thus it is desired to effectively control displacements of the motor and the reducer at start.

However, when there is a height difference between the positions of the insulators 5 and the center of gravity of the powertrain 2, it is difficult to control the displacement of the powertrain 2, the displacement of the motor is increased and thus excessive vibration may occur, thereby greatly deteriorating noise, vibration and harshness (NVH) performance of the vehicle.

SUMMARY

The present disclosure provides a mounting system for a powertrain which serves to mount the powertrain including a motor, a reducer, etc. in a commercial vehicle, such as a motor-driven truck, so as to secure a sufficient installation space for hoses or pipes and wiring elements inside vehicle body frames.

The present disclosure also provides a mounting system for a powertrain which greatly reduces a height difference between the center of gravity of the motor or the reducer and insulators, and may thus effectively control the displacement of the motor or the reducer and improve noise, vibration and harshness (NVH) performance of a vehicle.

In one aspect of the present disclosure, a mounting system for a powertrain of a vehicle includes: mounting units configured to mount the powertrain to a first vehicle body frame and a second vehicle body frame, which are disposed on both sides of the vehicle and extended in a forward and backward direction of the vehicle. In particular, each mounting unit of the mounting units includes: a vehicle body-side bracket, a powertrain-side bracket, and an insulator installed between the vehicle body-side bracket and the powertrain-side bracket and configured to insulate a vibration, wherein the vehicle body-side bracket and the powertrain-side bracket are fixed to a corresponding vehicle body frame among the first and second vehicle body frames. One form, in a state where the vehicle body-side bracket is coupled to an outer surface of the corresponding vehicle body frame, the vehicle body-side bracket extends in a downward direction of the corresponding vehicle body frame, and thus, the vehicle body-side bracket and the insulator are located in an outer space of the corresponding vehicle body frame.

In one form, the insulator may be coupled to a lower end of the vehicle body-side bracket extending in the downward direction of the vehicle body frame, and is located under the vehicle body frame.

In another form, the first and second vehicle body frames may respectively have a C-shaped cross-section, and, in a state in which the vehicle body-side bracket is located in the outer space of the vehicle body frame and the insulator is located under the vehicle body frame, pipes or hoses and wiring elements may be located in or pass through an inner space of each of the vehicle body frames.

In some forms of the present disclosure, an upper end of the vehicle body-side bracket may be coupled to the outer surface of the vehicle body frame, the vehicle body-side bracket may have a shape which extends downwards and is then bent laterally toward a center between the first and second vehicle body frames, and the insulator may be coupled to an end of the laterally bent part of the vehicle body-side bracket.

In some forms of the present disclosure, in a state where the powertrain-side bracket is coupled to a side surface of the powertrain, a lower end of the powertrain-side bracket may be coupled to the insulator.

In some forms of the present disclosure, the powertrain of the vehicle located between the first and second vehicle body frames disposed at both sides of the vehicle may be mounted by the mounting units so as to protrude downwards from the vehicle body frames, and thus, spaces above the vehicle body frames may be usable as part mounting spaces or loading spaces.

In some forms of the present disclosure, the mounting units may include a plurality of mounting units disposed along each of the vehicle body frames so as to support the powertrain at respective positions thereof.

In some forms of the present disclosure, the powertrain-side bracket of at least one of the mounting units disposed along each of the vehicle body frames may be coupled to a rear surface of the powertrain.

In some forms of the present disclosure, the rear surface of the powertrain may be a rear surface of a reducer, the powertrain-side bracket coupled to the rear surface of the reducer may have a plurality of coupling parts disposed at predetermined intervals in a length direction, and the respective coupling parts in a bonded state of the rear surface of the reducer may be coupled to the rear surface of the reducer.

In some forms of the present disclosure, the powertrain may include a motor and a reducer.

Other aspects and forms of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view schematically illustrating a supported state of a powertrain including an engine, a transmission, etc. by a conventional mounting system;

FIG. 2 is a view illustrating a height difference between the center of gravity of the powertrain and insulators in the conventional mounting system;

Figure 3:
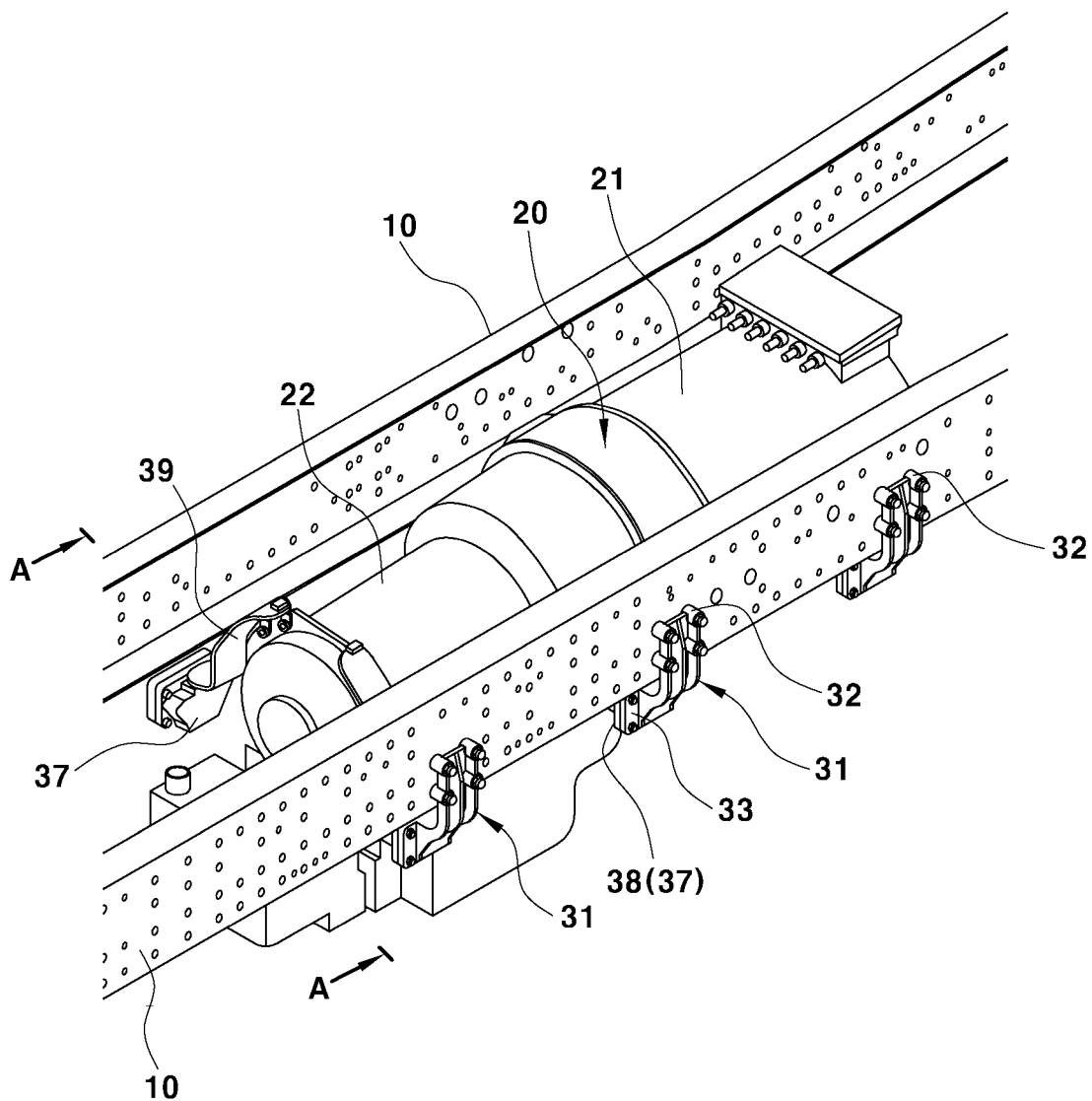
FIG. 3 is a perspective view illustrating a mounted state of a motor and a reducer on vehicle body frames by a mounting system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter reference will now be made in detail to various forms of the present disclosure, examples of which are illustrated in the accompanying drawings and described below. While the present disclosure will be described in conjunction with exemplary forms, it will be understood that present description is not intended to limit the present disclosure to those exemplary forms. On the contrary, the present disclosure is intended to cover not only the exemplary forms, but also various alternatives, modifications, equivalents and other forms, which may be included within the spirit and scope of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the following description of the forms, it will be understood that, when a part "includes" an element, the part may further include other elements but does not exclude the presence of other elements unless stated otherwise.

The present disclosure relates to a mounting system for a powertrain which may mount a powertrain including a motor, a reducer, etc. on vehicle body frames in a motor-driven vehicle, such as a fuel cell vehicle or an electric vehicle.

Particularly, the present disclosure relates to a mounting system which may be applied to a commercial vehicle, such as a motor-driven truck so as to mount a powertrain including a motor and a reducer on vehicle body frames disposed in the forward and backward directions of the vehicle.

As illustrated in FIG. 2, if there is a height difference between the center of gravity of the powertrain (a motor-reducer assembly) 2 and the insulators 5, the insulators 5 receive loads in the Y-axis direction and the Z-axis direction when the motor and the reducer rotate.

Here, as the height difference between the center of gravity of the powertrain 2 and the insulators 5 is decreased, the load in the Y-axis direction is decreased and the load in the Z-axis direction is increased. Since a K value (a spring stiffness value) in the Z-axis direction is much greater than that in the Y-axis direction, a displacement of the powertrain 2 to the load in the Z-axis direction may be effectively controlled.

Therefore, when the height difference between the powertrain 2 and the insulators 5 is reduced, the load in the Y-axis direction may be reduced and thus displacements of the motor and the reducer may be effectively controlled.

The present disclosure reduces a height difference between the center of gravity of a powertrain and insulators, and the exemplary forms of the present disclosure will be described in detail with reference to the accompanying drawings.

Figure 4:
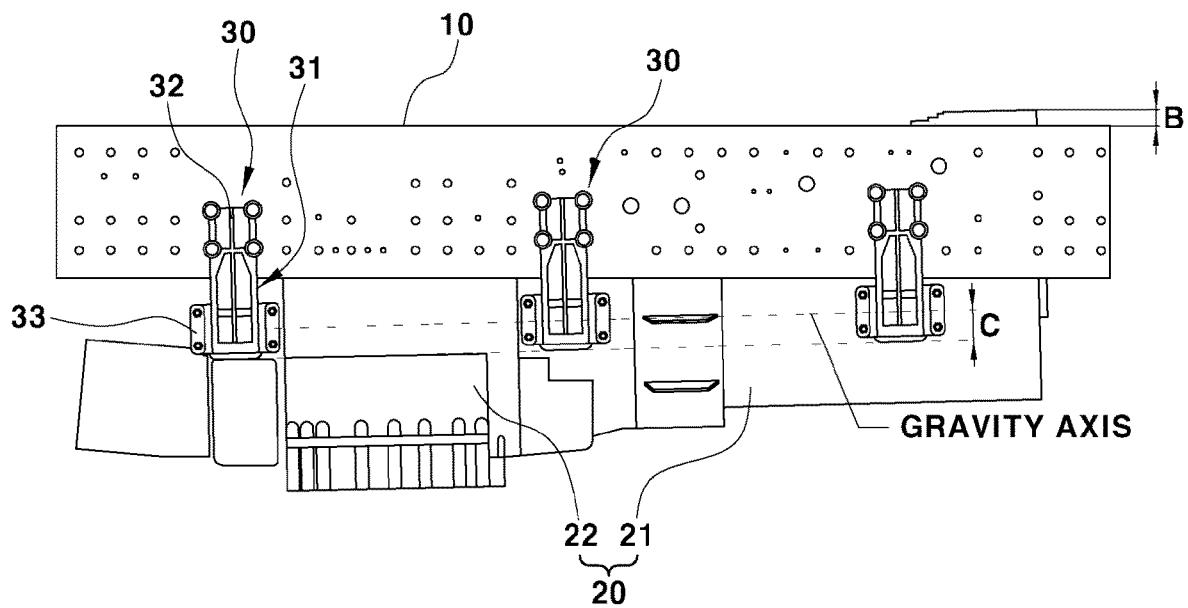
FIG. 4 is a side view illustrating the mounted state of the motor and the reducer on the vehicle body frames by the mounting system in one form of the present disclosure.

FIG. 3 is a perspective view illustrating a mounted state of a motor and a reducer on vehicle body frames by a mounting system in one form of the present disclosure, and FIG. 4 is a side view illustrating the mounted state of the motor and the reducer on the vehicle body frames by the mounting system in one form of the present disclosure.

Figure 5:
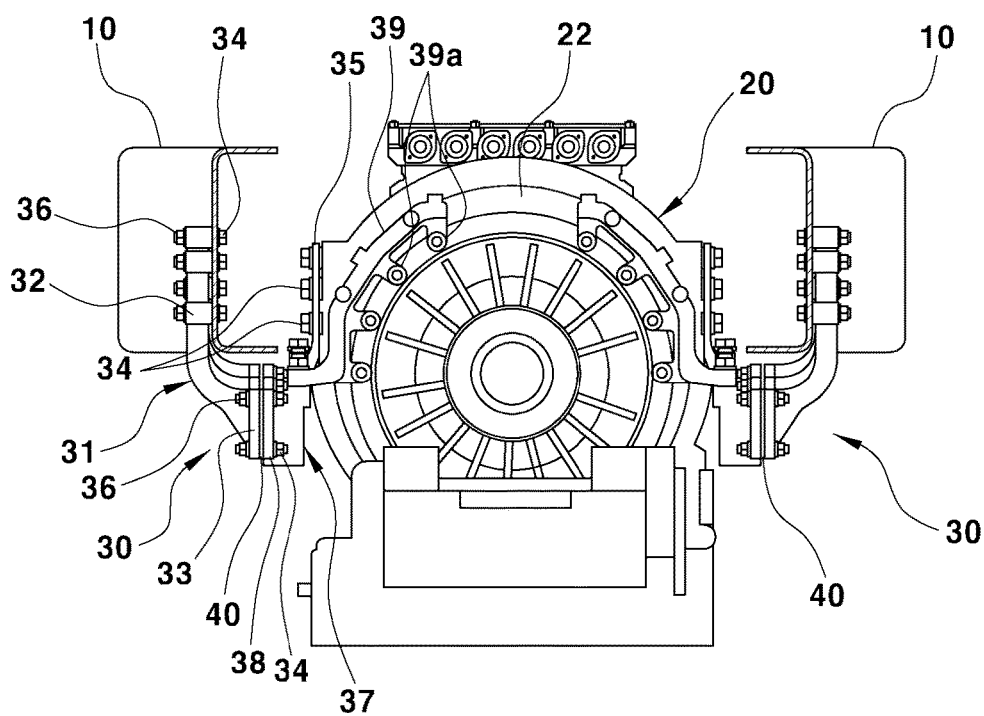
FIG. 5 is a cross-sectional view illustrating the mounted state of the motor and the reducer on the vehicle body frames by the mounting system in one form of the present disclosure.

FIG. 5 is a cross-sectional view taken along line A-A of FIG. 3 to illustrate the mounted state of the motor and the reducer on the vehicle body frames by the mounting system in one form of the present disclosure.

As shown in FIGS. 3 to 5, components of a powertrain, (i.e., a motor 21 and a reducer 22 which are coupled to each other) are mounted on two vehicle body frames 10 which are disposed on a commercial vehicle, such as a motor-driven vehicle, so as to extend in forward and backward directions of the vehicle.

Here, when the two vehicle body frames 10 are disposed at both sides of the vehicle, as shown in FIG. 5, the motor 21 and the reducer 22 in the coupled state are mounted to be located between the two vehicle body frames 10.

Further, the motor 21 and the reducer 22 are installed so as to be supported on the vehicle body frames 10 by the mounting system in one form of the present disclosure, and, the mounting system is interposed between the two vehicle body frames 10 at both sides of the vehicle and the motor 21 or the reducer 22.

That is, the mounting system is coupled to the two vehicle body frames 10 at both sides of the vehicle, the motor 21 and the reducer 22 are coupled to the mounting system, and thus, the motor 21 and the reducer 22 are mounted on the vehicle body frames 10 by the mounting system.

The mounting system in one form of the present disclosure includes: a plurality of mounting units 30 installed to respectively support the motor 21 or the reducer 22 on the vehicle body frames 10.

Here, each mounting unit 30 may include a vehicle body-side bracket 31, a powertrain-side bracket 35, and an insulator 37 which is installed to be interposed between the vehicle body-side bracket 31 and the powertrain-side bracket 35.

In one form of the present disclosure, one vehicle body-side bracket 31, one powertrain-side bracket 35, and one insulator 37 form one mounting unit 30, and such a mounting unit 30 is disposed at each mounting point of the vehicle body frames 10.

That is, the mounting system serves to mount the motor 21 and the reducer 22, which are coupled to each other (i.e., a motor-reducer assembly 20 of a powertrain), on the vehicle body frames 10 at respective mounting points, and, for this purpose, the mounting system includes a plurality of mounting units 30, each of which is disposed at each mounting point of the vehicle body frames 10.

Here, the mounting units 30 are configured to be interposed between the motor 21 or the reducer 22 and the vehicle body frames 10, and each mounting unit 30 includes one vehicle body-side bracket 31, one powertrain-side bracket 35, and one insulator 37.

In more detail, each mounting unit 30 includes the vehicle body-side bracket 31 which is fixedly installed at the vehicle body frame 10, the powertrain-side bracket 35 which is fixedly installed at the motor 21 or the reducer 22, and the insulator 37 which is installed to be interposed between the vehicle body-side bracket 31 and the powertrain-side bracket 35 and performs a vibration insulation function.

Referring to FIGS. 3 and 5, the motor-reducer assembly 20 is mounted to be located between the two vehicle body frames 10, and, as exemplarily shown in FIG. 4, the mounting units 30 are disposed at predetermined intervals along the respective vehicle body frames 10.

Referring to FIGS. 3 and 4, a total of six mounting units 30 is disposed at the two vehicle body frames 10 disposed at both sides of the vehicle, i.e., three mounting units 30 are disposed at predetermined intervals in the forward and backward directions at each vehicle body frame 10.

As such, the same number of the mounting units 30 may be disposed at each of the two vehicle body frames 10.

Although FIGS. 3 and 4 exemplarily illustrate a total of six mounting units 30, the number of the mounting units 30 is not limited three, as shown in FIGS. 3 and 4, and may be variously modified.

In one form of the present disclosure, the motor 21 and the reducer 22 are mounted so as to protrude downwards from the vehicle body frames 10, and in this case, the motor 21 and the reducer 22 may be mounted so as not to protrude upwards from the vehicle body frames 10.

In other form, the motor 21 and the reducer 22 may be mounted such that a most part of each of the motor 21 and the reducer 22 is located between the two vehicle body frame bodies 10 and under the two vehicle body frame bodies 10 and a predetermined part of each of the motor 21 and the reducer 22 protrudes upwards from the vehicle body frames 10, and in this case, the part of the motor 21 or the reducer 22 protruding upwards from the upper surfaces of the vehicle body frames 10 may be reduced or minimized.

Further, even if a part of the motor 21 or the reducer 22 inevitably protrudes upwards from the vehicle body fames 10, a height difference B (in FIG. 4) between the upper surfaces of the vehicle body frames 10 and the part of the motor 21 or the reducer 22 protruding from the upper surfaces of the vehicle body frames 10 may be reduced or minimized.

Thereby, a space located above the vehicle body frames 10 may be used as a mounting space of other parts or a loading space.

In one form, a vehicle body fixing unit 32 which is fixed to the outer surface of the vehicle body frame 10 is formed at the upper part of the vehicle body-side bracket 31 of the mounting unit 30, and a bonding part 33 which is fixed to the insulator 37 is formed at the lower end of the vehicle body-side bracket 31.

Here, the vehicle body-side bracket 31 may have a shape which extends downwards from the vehicle body fixing unit 32 and is then bent laterally toward the center between the two vehicle body frames 10, and the bonding part 33 corresponding to an end of the bent shape may be bonded to the side part of the insulator 37.

Accordingly, the vehicle body-side bracket 31 together with the insulator 37 is located in an outer space of the vehicle body frame 10, and the vehicle body-side bracket 31 is disposed throughout the outer surface to the lower end of the vehicle body frame 10. Here, the motor-reducer assembly 2 is mounted under the condition that the insulators 37 are disposed under the vehicle body frames 10.

Further, the lower end of the powertrain-side bracket 35 is coupled to the insulator 37 under the condition that the powertrain-side bracket 35 is coupled to the side surface of the motor 21 or the reducer 22, as exemplarily shown in FIG. 5.

Further, the vehicle body-side bracket 31 and the powertrain-side bracket 35 may be fixed to the insulator 37 using bolts 34 under the condition that the vehicle body-side bracket 31 and the powertrain-side bracket 35 are bonded to the insulator 37, and the vehicle body-side bracket 31 and the vehicle body frame 10 or the powertrain-side bracket 35 and the motor or the reducer 22 may also be fixed to each other using bolts 34.

Here, cylindrical pipes (not shown) through which the bolts 34 pass or nut members (not shown) to which the bolts 34 are screwed may be inserted into the insulator 37 formed of rubber.

Further, a nut 36 may be coupled to the end of the bolt 34 which is coupled to the vehicle body fixing part 32 of the vehicle body-side bracket 31 and the side surface (outer side surface) of the vehicle body frame 10 so as to pass therethrough under the condition that the vehicle body fixing part 32 and the side surface of vehicle body frame 10 are bonded, and a nut 36 may be coupled to the end of the bolt 34 which is coupled to the bonding part 33 of the vehicle body-side bracket 31 and a bonding part 38 of the insulator 37 so as to pass therethrough under the condition that the bonding part 33 and the bonding part 38 are bonded.

Further, in case of at least one of the mounting units 30 disposed along the vehicle body frame 10, i.e., the mounting unit 30 located at the endmost position may include a powertrain-side bracket 39 which is coupled to the rear surface of the reducer 22, as shown in FIG. 5.

In FIG. 5, reference numeral 39 indicates the powertrain-side bracket of the mounting unit 30 which is located at the endmost position out of the mounting units 30 disposed along the vehicle body frame 10, and the powertrain-side bracket 39 of the endmost mounting unit 30 is coupled to the rear surface of the reducer 22, as shown in FIG. 5.

Here, the powertrain-side bracket 39 extends to have a long length and may thus be bonded to the edge of the rear surface of the reducer 22, and a plurality of coupling parts 39a is formed at predetermined intervals in the length direction of the powertrain-side bracket 39.

The powertrain-side bracket 39 may be fixed to the reducer 22 by coupling the coupling parts 39a and the reducer 22 using bolts (not shown) under the condition that the coupling parts 39a are bonded to the rear surface of the reducer 22.

Further, the powertrain-side bracket 39 may be fixed to the insulator 37 by coupling the lower end of the powertrain-side bracket 39 and the insulator 37 using bolts 34 under the condition that the lower end of the powertrain-side bracket 39 is bonded to the insulator 37.

In FIG. 5, the powertrain-side bracket of another mounting unit 30 located at the rear of the endmost mounting unit 30 having the powertrain-side bracket indicated by reference numeral 39 is indicated by reference numeral 35.

The powertrain-side bracket indicated by reference numeral 35 has a structure in which the lower end of the powertrain-side bracket 35, which is bonded to the side surface of the motor 21 or the reducer, is coupled to the insulator 37, as described above.

In one form, as shown in FIG. 5, the mounting system may mount the motor-reducer assembly 20 such that the motor-reducer assembly 20 is disposed in an inner space between the two vehicle body frames 10 located at both sides of the vehicle.

In another form, the mounting system may mount the motor-reducer assembly 20 on the vehicle body frames 10 such that the motor-reducer assembly 20 protrudes downwards from the two vehicle body frames 10, and, in this case, the motor-reducer assembly 20 may not protrude upwards from the vehicle body frames 10.

Further, the mounting system may allow the motor-reducer assembly 20 to be located in the space between the two vehicle body frames 10 at both sides of the vehicle and mount the motor-reducer assembly 20 such that a part of the motor-reducer assembly 20 protrudes downwards from the vehicle body frames 10 not upwards from the vehicle body frames 10, and, in this case, the insulators 37 may be disposed so as to be located under the vehicle body frames 10.

Further, in a state in which the powertrain-side bracket 35 is coupled to the side surface of the motor 21 or the reducer 22, the lower end of the powertrain-side bracket 35 and the insulator 37 may be located just under the side surface of the motor 21 or the reducer 22 coupled to the powertrain-side bracket 35.

Thereby, as shown in FIG. 5, components for mounting are not located within the inner space of each vehicle body frame 10 having a C-shaped cross-section, and thus, this inner space may be used as a space in or through which a hose or pipe, a cable, etc. may be located or may pass.

Further, since the motor-reducer assembly 20 is located between the two vehicle body frames 10 so as to protrude downwards from the vehicle body frames 10 and the insulators 37 are also located under the two vehicle body frames 10, a height difference C (in FIG. 4) between the insulators 37 and the center of gravity of the motor-reducer assembly 20 may be greatly reduced as compared to the conventional height difference, and it is possible to effectively control displacements of the motor 21 and the reducer 22 due to miniaturization of the height difference.

Further, when the mounting system is applied, and the motor-reducer assembly 20 is initially mounted on the vehicle body frames 10, the motor-reducer assembly 20 may be moved from the upper parts to the lower parts of the vehicle body frames 10.

Thereafter, when, in order to receive NS after mounting of the motor-reducer assembly 20 in the vehicle, the motor-reducer assembly 20 is separated from the vehicle body frames 10, if other parts are mounted or loaded above the vehicle body frames 10, it is impossible to separate the motor-reducer assembly 20 from the vehicle body frames 10 by moving the motor-reducer assembly 20 in the upward direction of the vehicle body frames 10.

In this case, after the bolts 34 between the vehicle body-side brackets 31 and the insulators 37 are loosened and removed, the motor-reducer assembly 20 may be separated from the vehicle body frames 10 by moving the motor-reducer assembly 20 in the downward direction of the vehicle body frames 10.

Further, when the motor-reducer assembly 20 is remounted on the vehicle body frames 10 after A/S service, it is impossible to mount the motor-reducer assembly 20 on the vehicle body frames 10 by moving the motor-reducer assembly 20 in the downward direction from the upper parts of the vehicle body frames 10, and thus, the motor-reducer assembly 20 is mounted on the vehicle body frames 10 by moving the motor-reducer assembly 20 in the upward direction from the lower parts of the vehicle body frames 10.

Here, in order to inhibit or prevent occurrence of interference between the insulator 37 and the vehicle body-side bracket 31 due to the displacement of the insulator 37, a spacer 40 may be interposed between the bonding part 38 of the insulator 37 and the bonding part 33 of the vehicle body-side bracket 31.

The spacer 40 is applied in order to inhibit interference between the insulator 37 and the vehicle body-side bracket 31 when the motor-reducer assembly 2 is moved in the upward direction for reinstallation, and the spacer 40 is installed between the insulator 37 and the bonding part 33 of the vehicle body-side bracket 31 after upward movement of the motor-reducer assembly 20 is completed.

As such, the mounting system in the exemplary forms of the present disclosure may secure a sufficient installation space of hoses or pipes and wiring elements inside the vehicle body frames 10 and greatly reduce the height difference between the center of gravity of the motor 21 or the reducer 22 and the insulators 37, thus being capable of effectively controlling the displacement of the motor 21 or the reducer 22 and greatly improving noise, vibration and harshness (NVH) performance of the vehicle through displacement reduction.

Further, if the vehicle body-side brackets and the insulators are located in the inner space of each vehicle body frame as in the conventional mounting system, peripheral parts are first separated from the vehicle body frames and then the motor-reducer assembly is separated from the vehicle body frames during A/S, but, in the mounting system in the forms of the present disclosure, the motor-reducer assembly may be separated from the lower parts of the vehicle body frames during A/S, and thus, the number of other peripheral parts, which need to be first separated from the vehicle body frames in order to separate the motor-reducer assembly, may be greatly reduced and thereby maintainability may be secured.

As is apparent from the above description, a mounting system for a powertrain of a vehicle in the exemplary forms of the present disclosure may secure a sufficient installation space of hoses or pipes and wiring elements inside vehicle body frames and greatly reduce a height difference between the center of gravity of a motor or a reducer and insulators, thus being capable of greatly improving noise, vibration and harshness (NVH) performance of the vehicle.

The present disclosure has been described in detail with reference to the exemplary forms thereof. However, it will be appreciated by those skilled in the art that changes may be made in these forms without departing from the principles and spirit of the present disclosure.

What is claimed is:

1. A mounting system for a powertrain of a vehicle, the mounting system comprising:
    mounting units configured to mount the powertrain to a first vehicle body frame and a second vehicle body frame, which are disposed on both sides of the vehicle and extended in a forward and backward direction of the vehicle,
    wherein each mounting unit of the mounting units comprises:
        a vehicle body-side bracket,
        a powertrain-side bracket and
        an insulator installed between the vehicle body-side bracket and the powertrain-side bracket and configured to insulate a vibration,
    wherein the vehicle body-side bracket and the powertrain-side bracket are fixed to a corresponding vehicle body frame among the first and second vehicle body frames, and
    wherein the vehicle body-side bracket as coupled to an outer surface of the corresponding vehicle body frame is configured to extend in a downward direction of the corresponding vehicle body frame, and the vehicle body-side bracket and the insulator are located in an outer space of the corresponding vehicle body frame.

2. The mounting system of claim 1, wherein the insulator is coupled to a lower end of the vehicle body-side bracket and configured to extend in the downward direction of the corresponding vehicle body frame, and the insulator is located under the corresponding vehicle body frame.

3. The mounting system of claim 2, wherein:
    the first and second vehicle body frames respectively have a C-shaped cross-section; and
    in a state in which the vehicle body-side bracket is located in the outer space of the corresponding vehicle body frame and the insulator is located under the corresponding vehicle body frame, pipes or hoses and wiring elements are located in or pass through an inner space of the corresponding vehicle body frame.

4. The mounting system of claim 2, wherein:
    an upper end of the vehicle body-side bracket is coupled to the outer surface of the corresponding vehicle body frame;
    the vehicle body-side bracket is configured to extend downwards and then bent laterally toward a center between the first vehicle body frame and the second vehicle body frame; and
    the insulator is coupled to an end of a laterally bent part of the vehicle body-side bracket.

5. The mounting system of claim 2, wherein in a state where the powertrain-side bracket is coupled to a side surface of the powertrain, a lower end of the powertrain-side bracket is coupled to the insulator.

6. The mounting system of claim 1, wherein the powertrain of the vehicle is located between the first and second vehicle body frames as mounted by the mounting units, and protrudes downwards from the first and second vehicle body frames, such that spaces above the first and second vehicle body frames are provided as part mounting spaces or loading spaces.

7. The mounting system of claim 1, wherein the mounting units are disposed along each vehicle body frame of the first and second vehicle body frames and configured to support the powertrain at respective positions thereof.

8. The mounting system of claim 7, wherein at least one powertrain-side bracket of the mounting units is coupled to a rear surface of the powertrain.

9. The mounting system of claim 8, wherein:
    the rear surface of the powertrain corresponds to a rear surface of a reducer;
    the at least one powertrain-side bracket coupled to the rear surface of the reducer has a plurality of coupling parts disposed at predetermined intervals in a length direction; and the plurality of coupling parts are respectively coupled to the rear surface of the reducer.

10. The mounting system of claim 1, wherein the powertrain comprises a motor and a reducer.

* * * * *